US011087413B2

(12) United States Patent
Shen et al.

(10) Patent No.: US 11,087,413 B2
(45) Date of Patent: Aug. 10, 2021

(54) IDENTITY MAPPING BETWEEN COMMERCE CUSTOMERS AND SOCIAL MEDIA USERS

(71) Applicant: WAL-MART STORES, INC., Bentonville, AR (US)

(72) Inventors: Wei Shen, Danville, CA (US); Chris Undernehr, Bentonville, AR (US); Ioannis Pavlidis, Boulder, CO (US); Zoheb Vacheri, Sunnyvale, CA (US); Ronald Benson, San Francisco, CA (US)

(73) Assignee: WALMART APOLLO, LLC, Bentonville, AR (US)

( * ) Notice: Subject to any disclaimer, the term of this patent is extended or adjusted under 35 U.S.C. 154(b) by 334 days.

(21) Appl. No.: 15/878,748

(22) Filed: Jan. 24, 2018

(65) Prior Publication Data

US 2018/0150914 A1    May 31, 2018

Related U.S. Application Data

(62) Division of application No. 14/502,976, filed on Sep. 30, 2014.

(51) Int. Cl.
*G06Q 50/00* (2012.01)
*G06F 16/28* (2019.01)
*G06F 16/9535* (2019.01)

(52) U.S. Cl.
CPC .......... *G06Q 50/01* (2013.01); *G06F 16/285* (2019.01); *G06F 16/9535* (2019.01)

(58) Field of Classification Search
CPC ............... G06Q 50/01; G06Q 30/0251; G06Q 30/0269; G06Q 30/00; G06Q 30/0255;
(Continued)

(56) References Cited

U.S. PATENT DOCUMENTS

2003/0050916 A1    3/2003   Ortega et al.
2006/0089948 A1    4/2006   Picker et al.
(Continued)

OTHER PUBLICATIONS

Goga et al., "On Exploiting Innocuous User Activity for Correlating Accounts Across Social Network Site," International Computer Science Institute, May 2012 (https://pdfs.semanticscholar.org/f4f5/4a8334a71b63f51a91af5e26348d186187f5.pdf) (Year: 2012).*

(Continued)

*Primary Examiner* — Michelle T Kringen
*Assistant Examiner* — Lance Y Cai
(74) *Attorney, Agent, or Firm* — Bryan Cave Leighton Paisner LLP

(57) ABSTRACT

In one aspect, a computer system for evaluating the accuracy of an identity mapping method is disclosed. The system can comprise a system memory, one or more processors, and/or a computer readable medium containing compute-executable instructions representing a probability accuracy module. The probability accuracy module can be configured to query an identity map database for an identity map created using the identity mapping method, compare the identity map with additional social media data, calculate a correlation based on similarities between the social media data and the additional social media data, and/or verify the identity map based on the correlation. The identity map can be based on commerce data from a retailer and/or social media data from a first social media site. The additional social media data can be based on at least one of a second social media site different from the first social media site, a social media account expressly linked to a commerce customer account, and/or a social media database. Other embodiments are disclosed herein.

20 Claims, 6 Drawing Sheets

(58) Field of Classification Search
CPC ........... G06Q 30/0601; G06Q 30/0241; G06Q
20/123; G06Q 20/18; G06Q 30/0201;
G06Q 30/0224; G06Q 30/0276; G06Q
30/0277; G06Q 30/0631; G06Q 30/0641;
H04L 67/306; H04L 51/32; H04L 67/22;
H04L 51/046; H04L 51/36; H04L 67/02;
H04L 51/20; H04L 63/08; H04L 63/102;
G06F 16/9535
USPC ................................................ 705/26.7, 26.1
See application file for complete search history.

(56) References Cited

U.S. PATENT DOCUMENTS

| | | | |
|---|---|---|---|
| 2011/0238755 A1 | 9/2011 | Khan et al. | |
| 2011/0289026 A1 | 11/2011 | Kannan et al. | |
| 2012/0197750 A1 | 8/2012 | Batra et al. | |
| 2012/0271732 A1 | 10/2012 | Glass et al. | |
| 2012/0278147 A1 | 11/2012 | Kogan et al. | |
| 2012/0296776 A1 | 11/2012 | Kalai et al. | |
| 2012/0303659 A1* | 11/2012 | Erhart | H04L 29/12594 707/769 |
| 2013/0132860 A1* | 5/2013 | Vasko | G06Q 30/02 715/753 |
| 2015/0293997 A1* | 10/2015 | Smith | G06Q 50/01 707/749 |

OTHER PUBLICATIONS

Liu et al. 2014. HYDRA: Large-Scale Social Identity Linkage via Heterogeneous Behavior Modeling. Proceedings of the 2014 ACM SIGMOD International Conference on Management of Data (SIGMOD '14). ACM, New York, NY, USA, 51-62. https://doi.org/10.1145/2588555.2588559 (Year: 2014).*
Goga et al., "On Exploiting Innocuous user Activity for Correlating Accounts Across Social Network Site," Interntional Computer Science Institute (https://pdfs.semanticscholar.org/f4f5/4a8334a71b63f51a91af5e26348d186187f5.pdf) May 2012.
Funchun Peng, Dale Schuumans, "Combining Naive Bayes and n-gram Language Models for Text Classification" 2003.
Andrew Y. Ng, Michael I. Jordan, "On Discriminative vs. Generative Classifiers: A comparison of logistic regression and naive Bayes" 2002.
Schafer, J. Ben, Joseph A. Konstan, and John Riedl. "E-commerce recommendation applications," Applications of Data Mining to Electronic Commerce. Springer US, pp. 115-153 2001.

* cited by examiner $$P_i = \frac{1}{1 + e^{-(\alpha y_i + \beta_0 + \sum_{k=1}^{n} \beta_k x_{ik})}}$$

380

Where $P_i$ is the probability of a candidate social user i matching customer;

$y_i$ is the activity correlation between the two data sources;

$x_{ik}$'s are binary variables indicating whether there is a match for the kth inferred attribute between the customer and the candidate social user i;

$\alpha, \beta_i$'s are weights associated with activity correlation and inferred attributes.

Fig. 4

IDENTITY MAPPING BETWEEN COMMERCE CUSTOMERS AND SOCIAL MEDIA USERS

CROSS REFERENCE TO RELATED APPLICATIONS

The present patent application is a divisional application claiming priority to application Ser. No. 14/502,976, titled "Identity Mapping Between Commerce Customers and Social Media Users," filed Sep. 30, 2014, the disclosure of which is hereby incorporated by this reference in its entirety.

BACKGROUND

Field of the Invention

This invention relates generally to the field of identifying a customer's interest by analyzing their purchasing history and social activities and providing customer-specific information based on the analysis.

Related Art

In order to improve a customer's shopping experience and bring in more revenue, retailers place an emphasis on providing customers with personalized recommendations. A better understanding of the customer's personal interests plays an important role in improving the quality of the personalized recommendations. Traditional recommendation methodologies infer customers' interests based primarily on their historical interactions (e.g., online and offline transactions, online search queries and viewed items) with the retailer. Unfortunately, such an approach is incapable of going beyond interests revealed by transaction history, and only captures limited information about customers who have had only few transactions in the past with the retailer.

Social media sites, such as Facebook, Twitter, Pinterest, Instagram are platforms where people share personal interests, circulate information and exchange ideas. Social media data tend to be more up-to-date and have a better coverage on personal interests and hobbies than commerce transaction data. Data from social media generally enrich the understandings about customers and their interests. Retailers with access to customer social media data activities may be able to take a more "proactive" role in providing personalized recommendations, suggesting a wider variety of products that are more relevant, interesting, and unaware of by customers. However, identifying links between a customer and a social media user can be difficult to estimate and/or verify.

BRIEF DESCRIPTION OF THE DRAWINGS

The specific features, aspects and advantages of the present invention will become better understood with regard to the following description and accompanying drawings where:

FIG. 4 illustrates an example calculation equation for determining the probability of a customer identity.

DETAILED DESCRIPTION

Figure 1:
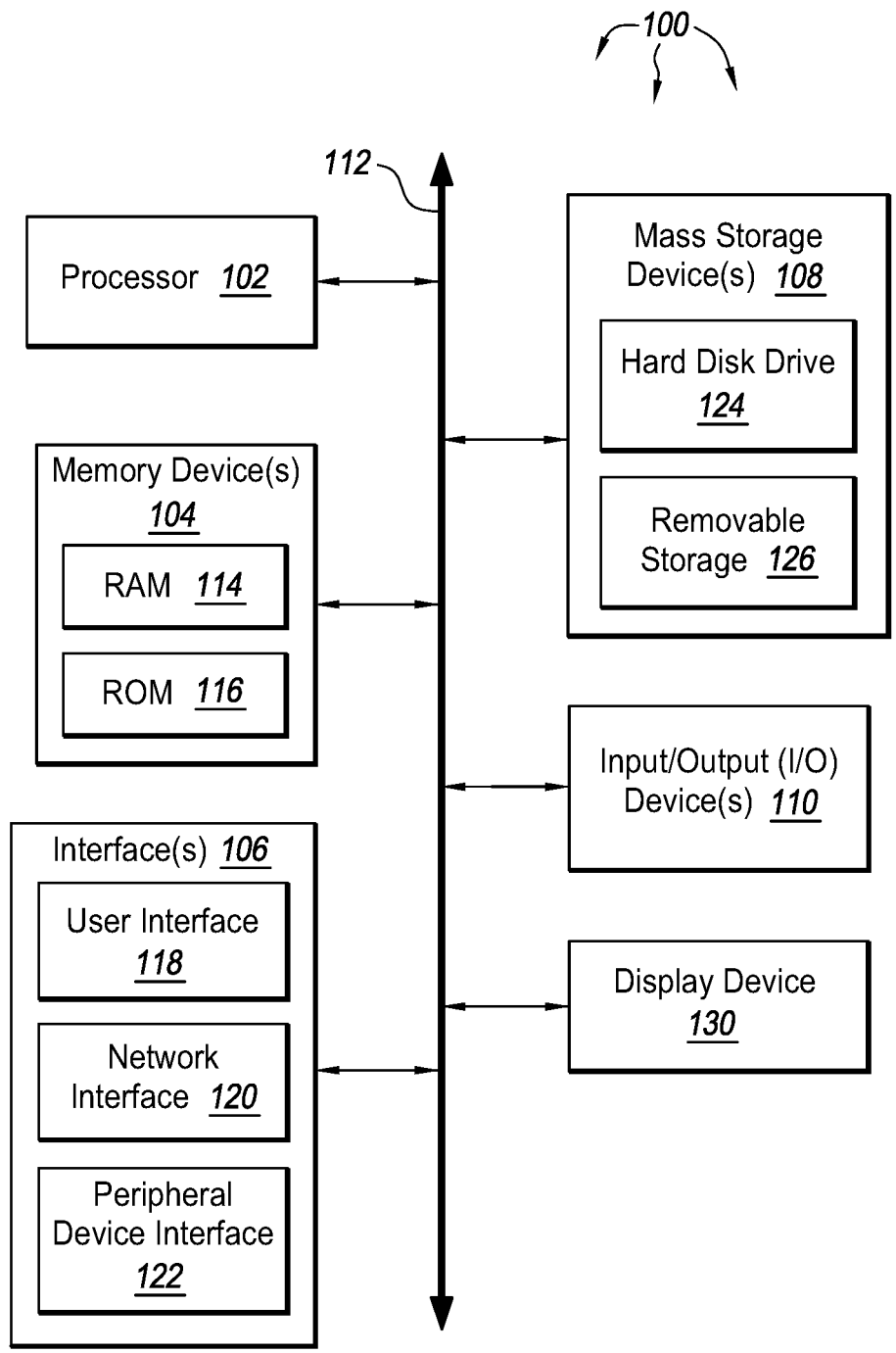
FIG. 1 illustrates an example block diagram of a computing device.

The present invention extends to methods for combining commerce data with social media data to provide personalized recommendations to a customer. Aspects of the invention use inferred attributes and activity correlations from both commerce data and social media data to map identities.

In one aspect, a computer system for evaluating the accuracy of an identity mapping method is disclosed. The system can comprise a system memory, one or more processors, and/or a computer readable medium containing compute-executable instructions representing a probability accuracy module. The probability accuracy module can be configured to query an identity map database for an identity map created using the identity mapping method, compare the identity map with additional social media data, calculate a correlation based on similarities between the social media data and the additional social media data, and/or verify the identity map based on the correlation. The identity map can be based on commerce data from a retailer and/or social media data from a first social media site. The additional social media data can be based on at least one of a second social media site different from the first social media site, a social media account expressly linked to a commerce customer account, and/or a social media database.

In another aspect, a method for evaluating the accuracy of an identity mapping method is disclosed. The method can comprise querying an identity map database for an identity map created using the identity mapping method, comparing the identity map with additional social media data, calculating a correlation based on similarities between the social media data and the additional social media data, and/or verifying the identity map based on the correlation. The identity map can be based on commerce data from a retailer and/or social media data from a first social media site. The additional social media data can be based on at least one of a second social media site different from the first social media site, a social media account expressly linked to a commerce customer account, and/or a social media database.

In one aspect, a commerce customer account is mapped to a social media user account. Commerce attributes for a commerce customer account are accessed from a commerce database. Social media attributes are accessed for one or more candidate social media user accounts from a social media database. Inferred commerce attributes are derived for the commerce customer account from the commerce attributes. Inferred social media attributes, for each of the one or more candidate social media user accounts, are derived from the social media attributes. Activity calculations between the commerce customer account and each of one of more candidate social media user accounts are calculated based on the inferred commerce attributes and the inferred social media attributes. A probability of the commerce customer account and the social media user account mapping to the same identity is estimated for each of the one or more candidate social media user accounts.

In another aspect, the accuracy of an identity mapping between a commerce customer and social media user is evaluated. An identity mapping between a commerce customer account and a social media user account is accessed. The identity mapping is based on commerce attributes from a merchant and social media attributes from a first social media site. Results of the identity mapping are compared to additional social media attributes. The additional social media attributes are accessed from one or more of: a social medial account expressly linked to the commerce customer account and a second social media site. A correlation between the social media attributes and the additional social media attributes is calculated. The identity mapping is verified based on the calculated correlation.

Embodiments of the present invention may comprise or utilize a special purpose or general-purpose computer including computer hardware, such as, for example, one or more processors and system memory, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, embodiments of the invention can comprise at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. RAM can also include solid state drives (SSDs or PCIx based real time memory tiered Storage, such as FusionIO). Thus, it should be understood that computer storage media (devices) can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, wearable devices, multi-processor systems, microprocessor-based or programmable consumer electronics, network PCs, minicomputers, mainframe computers, mobile telephones, watchers, PDAs, tablets, pagers, routers, switches, various storage devices, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the invention can also be implemented in cloud computing environments. In this description and the following claims, "cloud computing" is defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction, and then scaled accordingly. A cloud model can be composed of various characteristics (e.g., on-demand self-service, broad network access, resource pooling, rapid elasticity, measured service, etc.), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.).

It is further noted that, where feasible, functions described herein can be performed in one or more of: hardware, software, firmware, digital components, or analog components. For example, one or more application specific integrated circuits ("ASICs") can be programmed to carry out one or more of the systems and procedures described herein. Certain terms are used throughout the following description and Claims to refer to particular system components. As one skilled in the art will appreciate, components may be referred to by different names. This document does not intend to distinguish between components that differ in name, but not function.

In general, embodiments of the invention are directed to providing customers with specific information related to their product needs based on their attributes and inferred attributes. A commerce provider, such as a retailer, combines data stored in a commerce database with information from a social media user database to categorize a customer needs.

For example if a customer buys computer products and school supplies, is over age 18, and indicates on Facebook that he/she just graduated from high school, the retailer would send customer information specifically designed for a college student. Hence, commerce data and social media mappings often provide value for the retailer and the customer.

FIG. 1 illustrates an example block diagram of a computing device 100. Computing device 100 can be used to perform various procedures, such as those discussed herein. Computing device 100 can function as a server, a client, or any other computing entity. Computing device 100 can perform various communication and data transfer functions as described herein and can execute one or more application programs, such as the application programs described herein. Computing device 100 can be any of a wide variety of computing devices, such as a mobile telephone or other mobile device, a desktop computer, a notebook computer, a server computer, a handheld computer, tablet computer and the like.

Computing device 100 includes one or more processor(s) 102, one or more memory device(s) 104, one or more interface(s) 106, one or more mass storage device(s) 108, one or more Input/Output (I/O) device(s) 110, and a display device 130 all of which are coupled to a bus 112. Processor(s) 102 include one or more processors or controllers that execute instructions stored in memory device(s) 104 and/or mass storage device(s) 108. Processor(s) 102 may also include various types of computer-readable media, such as cache memory.

Memory device(s) 104 include various computer-readable media, such as volatile memory (e.g., random access memory ("RAM") 114) and/or nonvolatile memory (e.g., read-only memory ("ROM") 116). Memory device(s) 104 may also include rewritable ROM, such as Flash memory.

Mass storage device(s) 108 include various hardware storage devices, such as magnetic tapes, magnetic disks, optical disks, solid state memory (e.g., Flash memory), and so forth. As shown in FIG. 1, a particular mass storage device is a hard disk drive 124. Various drives may also be included in mass storage device(s) 108 to enable reading from and/or writing to the various computer readable media. Mass storage device(s) 108 include removable media 126 and/or non-removable media.

I/O device(s) 110 include various devices that allow data and/or other information to be input to or retrieved from computing device 100. Example I/O device(s) 110 include cursor control devices, keyboards, keypads, microphones, monitors or other display devices, speakers, printers, network interface cards, modems, cameras, lenses, CCDs or other image capture devices, and the like.

Display device 130 includes any type of device capable of displaying information to one or more users of computing device 100. Examples of display device 130 include a monitor, display terminal, video projection device, and the like.

Interface(s) 106 include various interfaces that allow computing device 100 to interact with other systems, devices, or computing environments. Example interface(s) 106 can include any number of different network interfaces 120, such as interfaces to personal area networks ("PANs"), local area networks ("LANs"), wide area networks ("WANs"), wireless networks (e.g., near field communication ("NFC"), Bluetooth, Wi-Fi, etc. networks), and the Internet. Other interfaces include user interface 118 and peripheral device interface 122.

Bus 112 allows processor(s) 102, memory device(s) 104, interface(s) 106, mass storage device(s) 108, and I/O device(s) 110 to communicate with one another, as well as other devices or components coupled to bus 112. Bus 112 represents one or more of several types of bus structures, such as a system bus, PCI bus, IEEE 1394 bus, USB bus, and so forth.

Figure 2:
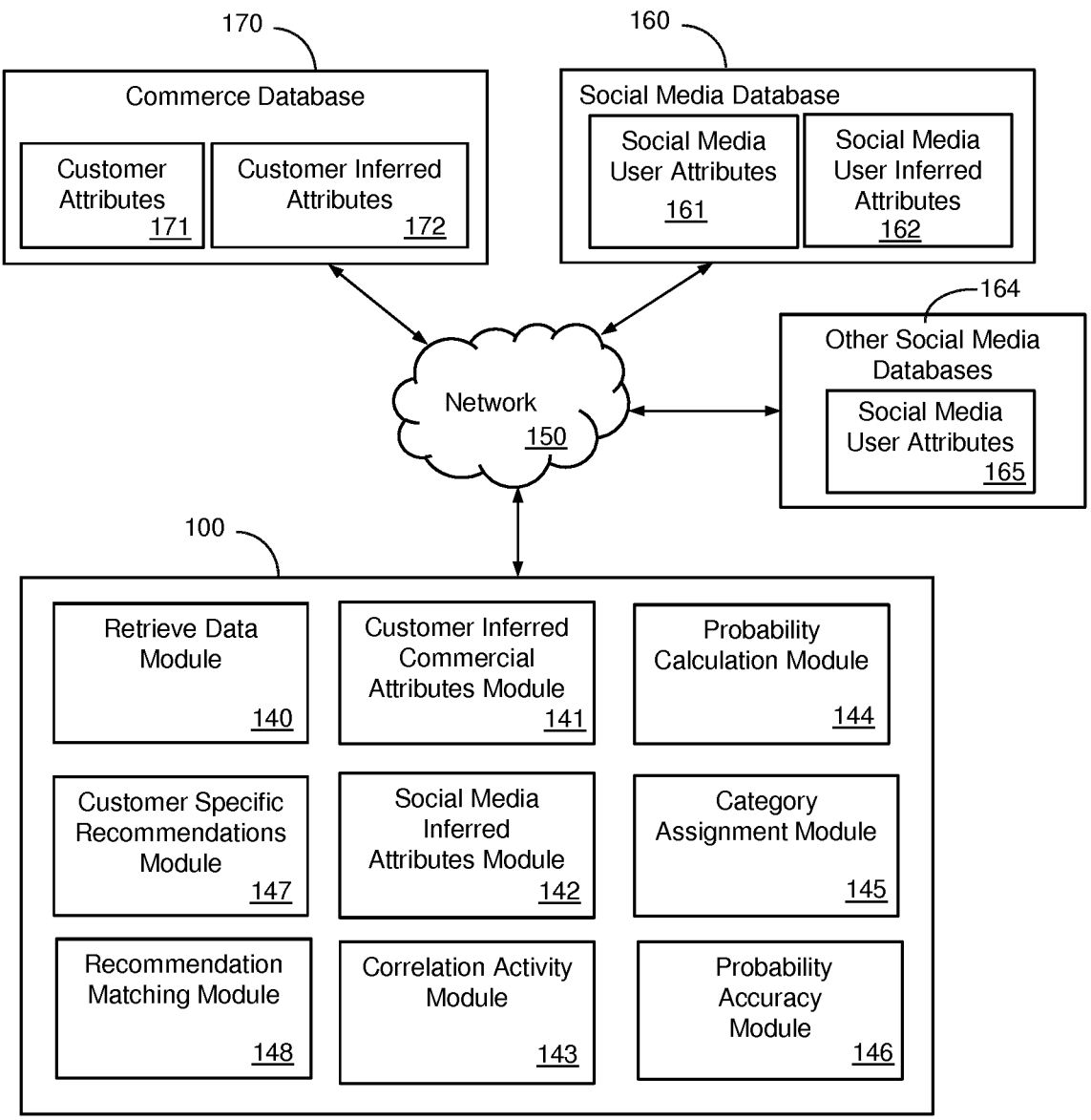
FIG. 2 illustrates an example computer architecture that facilitates mapping commerce data with social media data.

FIG. 2 illustrates an example computer architecture 200 that facilitates mapping commerce data and social media data. As depicted, computing device 100 is coupled to commerce database 170, social media database 160, and other social media databases 164 over network 150. Computing device 100 has several modules for use in mapping commerce customers with the social media users.

The commerce database 170 contains stored records of purchases made by offline and online customers of a retail store. The purchased items are associated with the identity of the customer. In addition, other information including date of purchase, category of purchase, a birth date, email address, number of children, and other family facts associated with the customer may be in the commerce database. In that regard, any information gather upon making a purchase may be entered into the commerce database. If the purchase is made with a credit card the retailer knows the customer name (or the name of a family member) and records the name in the commerce database 170. An online customer generally provides their address and a shipping address, email address, phone number and additional information. When a retailer gathers customer information related to purchases of multiple customers and stores that data, the retailer can store the customer information in the commerce database 170. The data associated with a customer are attributes of the customer.

An examination of the attributes may be used to generate inferred attributes. For example, if customer buys baby formula, an inferred attribute is the customer has a baby in their family. The age of the baby may be inferred if diapers are purchased for a 3 month old. The inferred attributes can be generated within the commerce database 170 or may be generated by computer system 100 and then stored in the commerce database. Inferred attributes can be static (e.g., gender) or dynamic (e.g., age).

Commerce data can come from a variety of sources, including:

Online profile information provided by customers upon registration. This can include real name, email address, and distinct customer ids.

Online transaction history including timestamp, customer id, item bought and shipping address at the granularity level of zip code.

Other online interaction history including search queries and items viewed by users, usually in the format of timestamp, customer id, search queries/viewed items.

Offline transaction history including timestamp, hashed tender ids, membership ids, store/club visited, and item bought.

Gift registry including real name, physical address, email address, registry event, and items registered for and personal information about customers who purchased gifts for each gift registry.

Automotive repairs including type of repair, real name, type of vehicle being repaired Layaway including real name and items placed in layaway Family/household information obtained through credit history data.

Social media sites, such as Facebook, gather a variety of information from its users. Although much of the information stored at social media sites is private, unless released by the user, a certain amount of information is available to the public and is normally accessed by using Facebook's public graph API or another such application. An information selection module within the social media database 160 may limit the release of private information, based on user choice, to the public, such as a retailer. However, it is often possible to map customer attributes and inferred attributes to a social user attributes and inferred attributes. In addition, correlation of time activities can be used to map a customer to a candidate social media user. The mapping process can assign a match probability for each customer and selective social media user.

Social media data can include all or part of the following:
Plain attributes such as user name, account handle/screen name, user description
Time series of text posts with information such as text, mentioned users, shared urls, hashtags, check-ins, shared posts from other social networks (e.g., spotify for music, get glue for TV), etc.
Transient location information about the user. E.g., city-country or latitude/longitude listed in user profile, location-enabled posts, and check-ins.
Graphical information about user's social network. E.g., followers/following, friends of the users, likes on Facebook pages, etc.

As such, commerce database 170 and/or social media database 160 can include information such as demographic attributes (gender, age range, ethnicity), family status (single, married, parent), circle of friends, devices/media/pets owned, affinity to different brands, personal interests (sports, religion, political orientation, etc.).

For demographic attributes, family status, and devices/media/pets owned, different classifiers can be constructed individually on both social and commerce data.

For circle of friends, on the commerce side, the circle of friends of a user can be constructed based on gift registry (i.e., customers for whom the user has bought gifts and all the customers who have bought gifts to the user). On the social side, circle of friends of a user is constructed based on series of interactions among users, including follow, mention, retweet, etc. Details of how circle of friends are constructed will be described in separate documents.

Brand affinity and other personal interests can be inferred through a bi-level approach. For each entity (i.e., brand/interest/hobby), a list of features representing the entity can be pre-selected. User's affinity toward the entity is then aggregated based on his/her interactions with the features. For example, features on the commerce side can be a pre-selected list of products that represent the entity. Features on the social media side can be a pre-selected list of influencers. For interactions, on commerce purchase, click, and search queries can be considered and on social like, follow, mention, retweet, etc. can be considered.

To illustrate the mapping method and process consider the following example. Suppose a person named "Alice Lee" from Portland, Oreg. is a customer in the commerce database 170. Further, we want to link her with a person on a social media site. By conducting a simple name+city match, we might locate, eight social users named "Alice Lee" living in Portland, Oreg. Next we determine which account, if any, corresponds to our customer. Following mapping method of the present disclosure, a series of inferred attributes is generated as described by the following examples.

The transaction history within the commerce database indicates that "Alice" has purchased a lot of baby products, and thus we infer her family status as "Parent". The social media database 160 having the eight candidate social media users indicates that six of the eight frequently talk about their children with friends. Therefor we inferred the six users have family status as "Parent", too.

Further, transaction history in the commerce database 170 shows that "Alice" has purchased several PS3 video games, and we infer she owns the platform of "PS3". Among the four candidates in the social media database 160, four of them follow the account of "Play Station 3", and we now have the inferred attribute that the four candidate media users have the platform "PS3".

In addition, the transaction history of the commerce database 170 indicates that "Alice" has clicked a lot of knitting books on the retail website. Another inferred attribute from the commerce database 170 is that she has a hobby of knitting. Among the remaining four social media candidates, three of them frequently post uniform resource locators (URLs) for knitting materials. The three candidate social users have an inferred attribute, from the social media website, of having a hobby of knitting or perhaps those that like "knitting".

Additionally, the commerce database 170 indicates that the user had a transaction at a local retail store on Jun. 1, 2012. On the other hand, only two of the remaining three social media candidates posted a "check-in" to the retail store on that day.

A gift registry of the commerce database indicates that "Alice" bought a gift for her friend named "Tracy". Among the remaining two social media candidates, one of them has connected to a friend named "Tracy" on social media. Most likely, the "Alice" linked to Tracy maps into the "Alice" in the commerce database 170. Based on the attributes and inferred attributes the probability of a correct match is high.

In one aspect, the probability of a match is determined as a value between 0.0 and 1.0. It is possible to get a perfect match of 1.0, a certain match. In other cases a probability of 0.0 is possible, for example, if a customer date of birth is not the same as the social media candidate. Because a limited amount of information, the attributes and inferred attributes from both databases 160, 170, match probabilities often have values between 0.0 and 1.0 and such values indicate some uncertainty.

As indicated by the above example attributes and inferred attributes provide a small snapshot of a person's life. However, when the attributes are analyzed they depict the "genomes" of the users and help distinguish one user from the others. When activity correlations exist and combined with the attribute analysis it is possible to have a higher level of confidence of the mapping.

Referring again to FIG. 2, computer device 100 further includes modules that provide functions for identity mapping between commerce customers and social media users. As described, commerce database 170 is populated with customer information gathered by a retailer. Further, the social media database 160 is populated with information provided social media users. The information in the social media database 160 may have access limitations as determined by a social media user and/or a social media provider.

In one aspect, identity mapping is initiated by retrieving data module 140 retrieving customer attributes 171 and/or other data from commerce database 170. Upon retrieving customer attributes 171 and/or other data from commerce database 170, customer inferred commercial attributes module 141 can derive customer inferred attributes 172. Customer inferred attributes 172 can be derived from customer personal data, items purchased, and other information in commerce database 170. Once derived, customer inferred attributes 172 can be stored in the commerce data base 170. It is possible in other aspects that customer inferred attributes 172 are derived by software elsewhere, such as by a processing module at another location.

Similarly, retrieve data module 140 can retrieve social media user attributes 161 from social media database 160. Upon retrieving social media user attributes 161 and/or other data from social media database 161, social media inferred attributes module 142 derives social media inferred attributes 162. Social media inferred attributes 162 can be derived from social media data, such as hobbies, links to interest groups, number of children, and other information that is available from the social media database 160.

Correlation activity module 143 is configured to compare data from (or inferred from) each of the databases 160, 170 to identify correlations. Activities in the commerce database 160 include, for example, date and time of purchase, time and date of a web search, and items purchased on that date. Social media activities include time and data a social user mentions a purchase, such as giving an identified gift to someone, a discussion about activities related to a recent purchase, and other such activities. As such, if a customer purchases an item at an identified date and time and then mentions a possible use of the item at a time near the purchase date, the purchase and mention of the item can be view as correlated (at least to some extent).

Upon retrieving attributes, deriving inferred attributes, and identifying correlated activities, probability calculation module 144 can determine a probability value between 0.0 and 1.0 that a customer and a social media user map to the same identity. There may be a possibility that an exact match exists, such as when an unusual name in the commerce database 170 is identical to the same unusual name in the social media database 160. In such a case the probability of a match is (or at least approaches) 1.0. It is also possible that no matches can be discovered. For example, if there is limited information available from either of the customer database 170 or social media database 160, or the customer does not participate in any social media activities then the probability of a match is (or at least approaches) zero. Based on other data, probability calculation module 144 may determine the probability of a match using statistically techniques, such as, probability equation 380 as depicted in FIG. 4. Other equations and methods for determining the probability of a match are possible in other embodiments.

Upon identifying a customer match with a given probability, the customer is assigned a category. Category assignment can be dependent on the value of the probability of a match. Associated with the category assignment are threshold values that may be different for each category. Threshold values may be high, such as, for example, 0.99, where a mistake could damage the customer/retail relationship. In other cases the threshold could be low, such as, for example 0.60.

The number and description of such categories can be determined by the retail provider. Examples of such categories include but are not limited to a male college student, a mother with new baby, a person that buys groceries, a pet owner, etc. The number of categories could be just a few or a large number. Category assignment module 145 can be configured to link a customer to one or more categories. Further, each category can have a set of recommendations available through various media types, such as, for example, brochures, advertisements, webpages and other. The recommendations can be communicated to an identified customer to improve their shopping experience. Based on a customer category (or combination of customer categories), customer specific recommendations module 147 can generate customer specific recommendations. Recommendations can be generated by those skilled in marketing and customer attributes, through automated algorithms, or other mechanisms.

Probability accuracy module 146 is configured to evaluate the accuracy of a probability that a customer and a social media user map to the same identity (e.g., as determined by probability calculation module 144). Probability accuracy module 146 can gather additional information, such as, data from other social media databases 164. Other information, such as subsequent updates in commerce database 170 and social media database 160, can also be gathered. Upon gathering and considering additional information, probability accuracy module 146 can formulate a degree of certainty that a customer and a social media user do map to the same identity. In one aspect, probability accuracy module can determine with a relatively high degree of certainty if a mapping is accurate. When accuracy does not meet the needs of the retailer, probability calculation module 144 can be modified so that improvements are made for providing a probability of a match. In one aspect, probability calculation module 144 is continuously improved, such as, for example, using machine learning algorithms.

Figure 3:
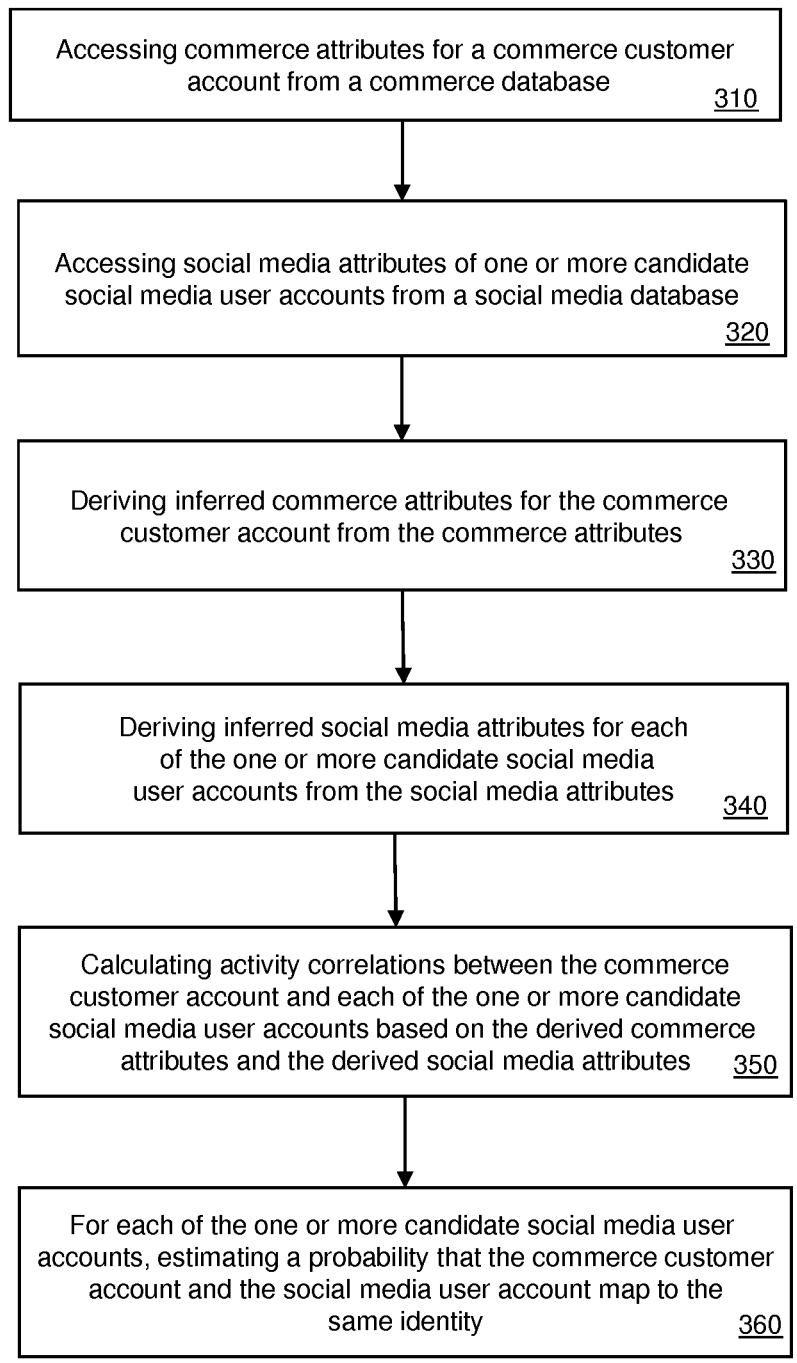
FIG. 3 illustrates an example method for mapping commerce data and social media data to determine a probability of a customer and a social media user mapping to the same identity.

FIG. 3 illustrates a flow chart 300 of an exemplary method 300 for estimating the probability of a customer and a social media map to the same identity. The method 300 will be described with respect to the components, modules and data in computer architecture 200.

In general, method 300 can be used to provide a retailer with the probability of a customer match with a social media user. When a probability of match is determined, the retailer can provide the customer with customer specific information in order to improve the customer's shopping experience. When a retailer detects purchases, the retailer can store customer purchase information in commerce database 170. It may be that many customers purchase items at a retail store or buy items from a retailer's online website. In addition, many of the customers may be social media users and have social media information stored in a social media database 160.

Method 300 includes accessing commerce attributes for the commerce customer account from a database (310). For example, retrieve data module 140 can access commerce attributes 171 from commerce database 170. Method 300 further includes accessing social media attributes of one or more candidate social media user accounts from a social media database (320). For example, retrieve data module 140 can access social media attributes 161 form social media database 160.

Method 300 includes deriving inferred commerce attributes for the commerce customer account from commerce attribute (330). For example, customer inferred commercial attribute module 141 can derive customer inferred attributes 172 from customer attributes 171. Method 300 includes deriving inferred social media attributes for each of the one or more candidate social media user accounts from the social media attributes (340). For example, social media inferred attributes module 142 can derive social media user inferred attributes 162 form social media user attributes 161.

Method 300 includes calculating activity correlations between the commerce customer account and each of the one or more candidate social media user accounts based on the derived commerce attributes and the derived social media attributes (350). For example, correlation activity module 143 can calculate correlations between a commerce customer account corresponding to customer inferred attributes 172 and each of one or more social media user accounts corresponding to data in social media user inferred attributes 162. In one aspect, one or more time series are used to computer activity correlations. One time series is a series of transaction timestamps at the commerce retail stores for the commerce user. Another time series is a series of timestamps of social media posts which are associated with commerce retails stores for each candidate social users. The association is indicated by, for example, check-in to stores, posts from stores, or express message saying that "I am at xx store".

Method 300 includes for each of the one or more candidate social media user accounts, estimating a probability that the commerce customer account and the social media user account map to the same identity (360). For example, probability calculation module 144 can estimate a probability that the commerce customer account corresponding to customer inferred attributes 172 and each of one or more social media user accounts corresponding to data in social media user inferred attributes 162 map to the same identity.

In one aspect, rules for identifying a candidate match on social data are as follows, a customer "A" and a social media user "b" is regarded as a candidate pair if at least two of the following four criteria are satisfied:
 i) "A"'s email matches "b"'s email
 ii) "A"'s name matches "b"'s name (or "b"'s name listed from another social media network)
 iii) "A"'s screenname (the substring before the character "@" in the customer's email) matches "b"'s screenname (or "b"'s screenname listed from another social media)
 iv) "A"'s home location (city+country) matches "B"'s home location As described, FIG. 4 depicts an exemplary equation 380 that estimates the probability of a match for each of the "i" candidate social media users. A description of variables used in equation 380 is also shown in FIG. 4. In other embodiments other equations and other methods are possible for estimating the probability of a match. In one aspect, a candidate social media user having the greatest probability of a match is considered to be an appropriate match to a customer if the estimated probability of the social media user being a match is also above a threshold value (e.g., 0.7). Thus, if a greatest probability of a match is above 0.8, the match is considered appropriate. On the other hand, if a greatest probability match is 0.6, the match is not considered appropriate.

In another aspect, if estimated probabilities for all candidate social media users are below another threshold value (e.g., 0.1), then no candidate social media users are considered an appropriate match for the customer.

An evaluation framework can be utilized to evaluate accuracy of an identity mapping (e.g., output by method 300 or any other method). For the portions of customers who expressly connect their social media accounts with their customer accounts, the precision/recall of the identity mapping methods can be directly computed. On the other hand, for users who do not directly connect their social media account with customer account, customers can be mapped to two or types of social media independently (e.g., facebook and twitter). Subsequently, analysts can manually cross check their social media profiles with images to see if the accounts are correctly matched, or compared those with the subset of twitter users who post their facebook accounts in their twitter profile. For any customer-social user pairs who have rich data and high mapping probabilities, some of the data can be masked from both sides to see if an identity mapping is still detected.

Figure 5:
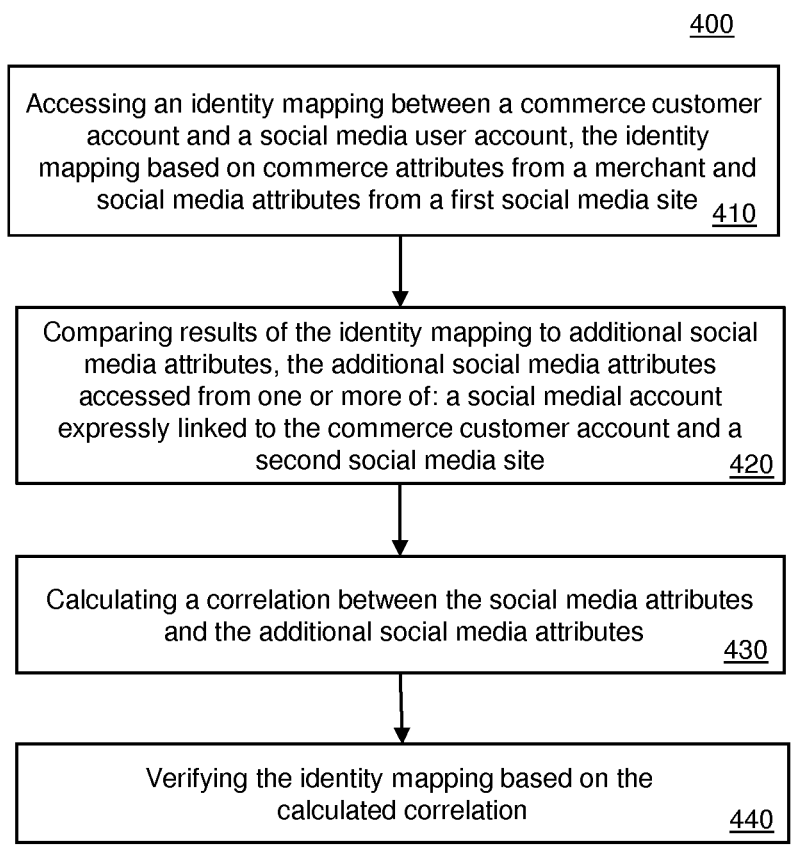
FIG. 5 illustrates an example method for assessing the accuracy of a method for determining the probability of correct customer identification.

FIG. 5 illustrates a flow chart of an exemplary method 400 for assessing the accuracy of a mapping, such as, for example, the mapping method 300 of FIG. 3. Method 400 includes accessing an identity mapping between a commerce customer account and a social media user account, the identity mapping based on commerce attributes from a merchant and social media attributes from a first social media site (410). For example, probability accuracy module can access a mapping between a customer corresponding to customer attributes 171 and a social media user corresponding to a portion of social media user attributes 161.

Method 400 includes comparing results of the identity mapping to additional social media attributes the additional social media attributes accessed from one or more of: a social media account expressly linked to the commerce customer account and a second social media site (420). For example, probability accuracy module 146 can compare the mapping to social media user attributes 165 in other social media databases 164. Social media user attributes 165 can be expressly linked to the customer corresponding to customer attributes 171. Alternately and/or in combination, other social media databases 164 may be associated with a different social media site than social medial database 160.

Method 400 includes calculating a correlation between the social media attributes and the additional social media attributes (430). For example, probability accuracy module 146 can calculate a correlation between the portion of social media user attributes 161 and social media user attributes 165. Method 400 includes verifying the identity mapping based on the calculated correlation (440). For example, probability accuracy module 146 can verify the identity mapping between a customer corresponding to customer attributes 171 and a social media user corresponding to a portion of social media user attributes 161 based on the correlation between the portion of social media user attributes 161 and social media user attributes 165.

Output from method 400 can be used to tune and/or optimize method 300. For example, if method 300 has an unacceptable number of incorrect mappings, method 300 can be adjusted based on output from method 400. Machine learning and statistical techniques can be used to adjust method 300.

Figure 6:
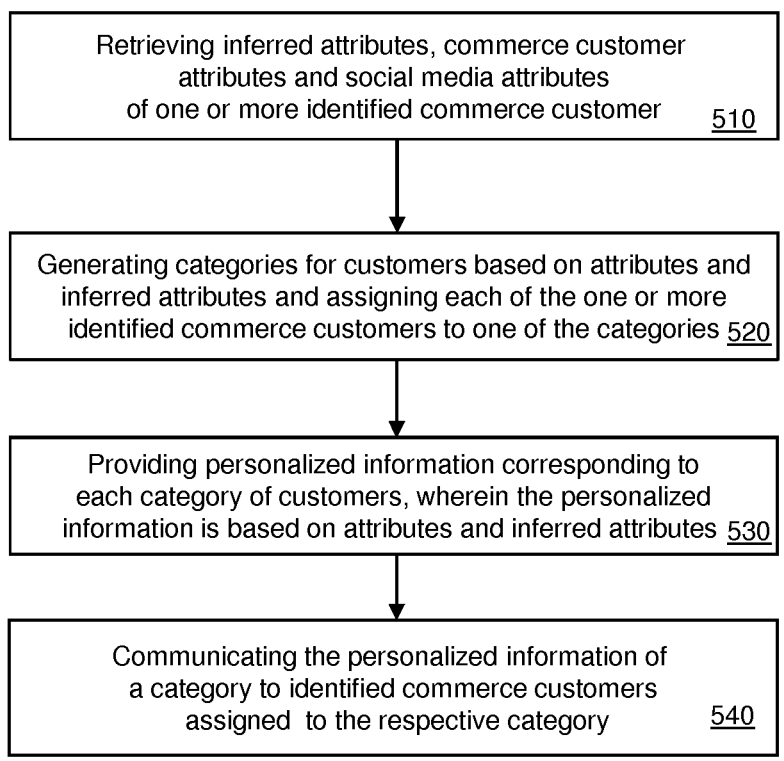
FIG. 6 illustrates an example method for providing personalized information upon determination of a customer identity.

FIG. 6 illustrates a flow chart of an exemplary method 500 for providing personalized information to one or more identified commerce customers. Method 500 includes retrieving inferred attributes, commerce customer attributes and social media attributes of one or more identified commerce customer (510). For example, recommendation matching module 148 can retrieve customer attributes 171, inferred customer attributes 172, and an appropriate corresponding portion of social media user attributes 161. Method 500 includes generating categories for customers based on attributes and inferred attributes and assigning each of the one or more identified commerce customers to one of the categories (520). For example, recommendation matching module 148 can generate customer categories based on data in commerce database and social media database. Recommendation matching module 148 can assign a customer account corresponding to customer attributes 171 to customer category based on customer attributes 171, inferred customer attributes 172, and the appropriate corresponding portion of social media user attributes 161.

Method 500 includes providing personalized information corresponding to each category of customers, wherein the personalized information is based on attributes and inferred attributes (530). For example, recommendation matching module 148 can provide personalized information to the customer account corresponding to customer attributes 171 based on the assigned category. Method 500 includes communicating the personalized information of a category to identified commerce customers assigned to the respective category (540). For example, recommendation matching module 148 can communicate personalized information to the customer corresponding to customer attributes 171. The personalized information could be emailed to the identified commerce customer, mailed as information flier, or other such means of providing information to commerce customers.

Further, although specific embodiments of the invention have been described and illustrated, the invention is not to be limited to the specific forms or arrangements of parts so described and illustrated. The scope of the invention is to be defined by the claims appended hereto, any future claims submitted here and in different applications, and their equivalents.

We claim:

1. A computer system for evaluating accuracy of an identity mapping method, the computer system comprising:
   a system memory;
   one or more processors; and
   a computer readable medium containing computer-executable instructions configured to:
      query an identity map database for an identity map created using the identity mapping method, wherein:
         the identity map is based on commerce data for a commerce customer account of a retailer and social media data from a social media user account of a first social media site provided by an entity other than the retailer; and
         the identity mapping method comprises:
            estimating a probability that the commerce customer account of the retailer and the social media user account of the first social media site map to a same identity using a logistic function having an exponential term, the exponential term comprising:
               a term describing an activity correlation between the commerce customer account and the social media user account;
               one or more binary terms describing whether there is a match between inferred attributes of the commerce customer account and inferred attributes of the social media user account, wherein at least one of the one or more binary terms is multiplied by a weight associated with the activity correlation between the commerce customer account and the social media user account; and
               a term describing a sample size of the identity mapping method;
      compare the identity map with additional social media data, wherein the additional social media data is based on at least one of a second social media site different from the first social media site, a social media account expressly linked to the commerce customer account, or a social media database;
      calculate an additional correlation based on similarities between the social media data and the additional social media data; and
      verify the identity map based on the additional correlation.

2. The computer system of claim 1, wherein a portion of the social media data is masked.

3. The computer system of claim 1, wherein the computer-executable instructions are further configured to gather an additional information, wherein the additional information is based on at least one of a subsequent update in a commerce database, a subsequent update in the social media database, or a subsequent update in the second social media site.

4. The computer system of claim 3, wherein the additional social media data is based on the additional information.

5. The computer system of claim 1, wherein the computer-executable instructions are further configured to optimize the identity mapping method based on an unacceptable number of incorrect mappings.

6. The computer system of claim 5, wherein the computer-executable instructions are further configured to use at least one of a machine learning method or a statistical method to optimize the identity mapping method.

7. The computer system of claim 1, wherein:
   the computer-executable instructions are further configured to gather an additional information, wherein the additional information is based on at least one of a subsequent update in a commerce database, a subsequent update in the social media database, or a subsequent update in the second social media site; and
   a portion of the social media data is masked.

8. The computer system of claim 1, wherein the identity mapping method further comprises:
   accessing the commerce data for the commerce customer account from a commerce database of the retailer, the commerce data for the commerce customer account being collected by the retailer for storage in the commerce database;
   accessing the social media data of one or more candidate social media user accounts from the social media database, the one or more candidate social media user accounts comprising the social media user account;
   deriving inferred commerce attributes for the commerce customer account from the commerce data for the commerce customer account;
   deriving respective inferred social media attributes for each respective candidate social media user account of the one or more candidate social media user accounts from the social media data of the one or more candidate social media user accounts;
   calculating a respective activity correlation between the commerce customer account and each respective candidate social media user account of the one or more candidate social media user accounts based on the inferred commerce attributes and the respective inferred social media attributes; and
   for each respective candidate social media user account of the one or more candidate social media user accounts:
      determine that the probability, as estimated, exceeds a predetermined threshold value;
      when the probability, as estimated, that the commerce customer account and the respective candidate social media user account map to the same identity exceeds the predetermined threshold value, assigning the commerce customer account to one or more customer categories based on (1) the inferred commerce attributes for the commerce customer account and (2) the respective inferred social media attributes for the respective candidate social media user account; and
      coordinating displaying one or more recommendations on a customer electronic device associated with the commerce customer account, the one or more recommendations based on the one or more customer categories assigned to the commerce customer account.

9. The computer system of claim 1, wherein the logistic function comprises:

$$P_i = \frac{1}{1 + e^{-(\alpha y_i + \beta_0 + \Sigma_{k=1}^n \beta_k x_{ik})}}$$

where $P_i$ is the probability that the commerce customer account and the social media user account i map to the same identity;
$y_i$ is the activity correlation between the commerce customer account and the social media user account;
$x_{ik}$ are binary variables indicating whether there is the match for a kth inferred attribute between the commerce customer account and the social media user account i;
n is the sample size;
$\alpha$ is a first weight; and
$\beta$ is a respective weight associated with a respective activity correlation between the commerce customer account and a respective candidate social media user account.

10. The computer system of claim 1, wherein estimating the probability that the commerce customer account of the retailer and the social media user account of the first social media site map to the same identity comprises:
summing each term of the one or more binary terms describing whether there is a match between the inferred attributes of the commerce customer account and the inferred attributes of the social media user account.

11. A method for evaluating the accuracy of an identity mapping method, the method comprising:
querying an identity map database for an identity map created using the identity mapping method, wherein:
the identity map is based on commerce data for a commerce customer account of a retailer and social media data from a social media user account of a first social media site provided by an entity other than the retailer; and
the identity mapping method comprises:
estimating a probability that the commerce customer account of the retailer and the social media user account of the first social media site map to a same identity using a logistic function having an exponential term, the exponential term comprising:
a term describing an activity correlation between the commerce customer account and the social media user account;
one or more binary terms describing whether there is a match between inferred attributes of the commerce customer account and inferred attributes of the social media user account, wherein at least one of the one or more binary terms is multiplied by a weight associated with the activity correlation between the commerce customer account and the social media user account; and
a term describing a sample size of the identity mapping method;
comparing the identity map with additional social media data, wherein the additional social media data is based on at least one of a second social media site different from the first social media site, a social media account expressly linked to the commerce customer account, or a social media database;
calculating an additional correlation based on similarities between the social media data and the additional social media data; and
verifying the identity map based on the additional correlation.

12. The method of claim 11, wherein a portion of the social media data is masked from a computer system performing at least a portion of the identity mapping method.

13. The method of claim 11 further comprising gathering an additional information, wherein the additional information is based on at least one of a subsequent update in a commerce database, a subsequent update in the social media database, or a subsequent update in the second social media site.

14. The method of claim 13, wherein the additional social media data is based on the additional information.

15. The method of claim 11 further comprising optimizing the identity mapping method based on an unacceptable number of incorrect mappings.

16. The method of claim 15 further comprising using at least one of a machine learning method or a statistical method to optimize the identity mapping method.

17. The method of claim 11, wherein:
the method further comprises:
gathering an additional information, wherein the additional information is based on at least one of a subsequent update in a commerce database, a subsequent update in the social media database, or a subsequent update in the second social media site; and
a portion of the social media data is masked from the probability accuracy module.

18. The method of claim 11, wherein the identity mapping method further comprises:
accessing the commerce data for the commerce customer account from a commerce database of the retailer, the commerce data for the commerce customer account being collected by the retailer for storage in the commerce database;
accessing the social media data of one or more candidate social media user accounts from the social media database, the one or more candidate social media user accounts comprising the social media user account;
deriving inferred commerce attributes for the commerce customer account from the commerce data for the commerce customer account;
deriving respective inferred social media attributes for each respective candidate social media user account of the one or more candidate social media user accounts from the social media data of the one or more candidate social media user accounts;
calculating a respective activity correlation between the commerce customer account and each respective candidate social media user account of the one or more candidate social media user accounts based on the inferred commerce attributes and the respective inferred social media attributes; and
for each respective candidate social media user account of the one or more candidate social media user accounts:
determine that the probability, as estimated, exceeds a predetermined threshold value;
when the probability, as estimated, that the commerce customer account and the respective candidate social media user account map to the same identity exceeds the predetermined threshold value, assigning the commerce customer account to one or more customer categories based on (1) the inferred commerce attributes for the commerce customer account and (2) the respective inferred social media attributes for the respective candidate social media user account; and coordinating displaying one or more recommendations on a customer electronic device associated with the commerce customer account, the one or more recommendations based on the one or more customer categories assigned to the commerce customer account.

19. The method of claim 11, wherein the logistic function comprises:

$$P_i = \frac{1}{1 + e^{-(\alpha y_i + \beta_0 + \Sigma_{k=1}^n \beta_k x_{ik})}}$$

where $P_i$ is the probability that the commerce customer account and the social media user account i map to the same identity;

$y_i$ is the activity correlation between the commerce customer account and the social media user account;

$x_{ik}$ are binary variables indicating whether there is the match for a kth inferred attribute between the commerce customer account and the social media user account i;

n is the sample size;

$\alpha$ is a first weight; and $\beta$ is the weight associated with a respective activity correlation between the commerce customer account and the respective candidate social media user account.

20. The method of claim 11, wherein estimating the probability that the commerce customer account of the retailer and the social media user account of the first social media site map to the same identity comprises:

summing each term of the one or more binary terms describing whether there is a match between the inferred attributes of the commerce customer account and the inferred attributes of the social media user account.

* * * * *